Jan. 27, 1948.  O. A. HUBER  2,435,082
GRIPPING DEVICE FOR BED CLOTHING
Filed Oct. 25, 1945
FIGURE 1.
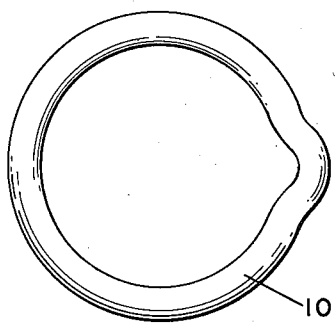
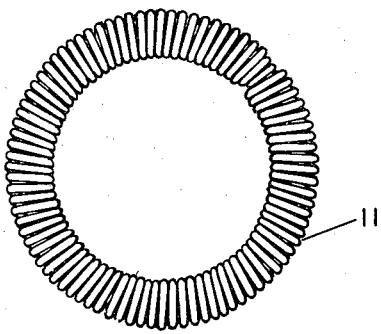
FIGURE 2.
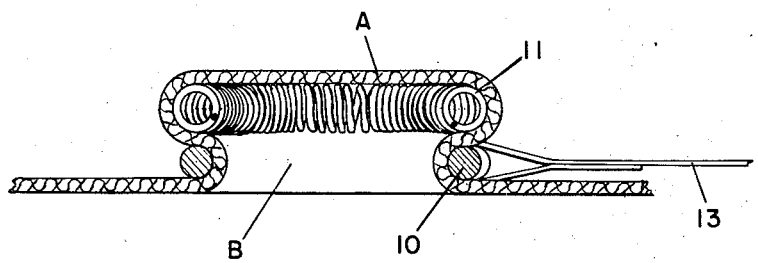
FIGURE 3.
*INVENTOR.*
O. A. HUBER
BY *Victor J. Evans & Co.*
ATTORNEYS Patented Jan. 27, 1948

2,435,082

UNITED STATES PATENT OFFICE 2,435,082

GRIPPING DEVICE FOR BED CLOTHING

Otmar A. Huber, Oroville, Calif.

Application October 25, 1945, Serial No. 624,406

1 Claim. (Cl. 24—245)

The invention relates to a fastening device, and more especially to a gripping assembly.

The primary object of the invention is the provision of an assembly of this character, wherein bed clothing or other coverings can be firmly and securely gripped for the holding thereof to avoid displacement while in use, the assembly being such that the coverings will be securely held without damage thereto, and is applied and removed with ease and dispatch.

Another object of the invention is the provision of an assembly of this character, wherein the construction thereof is novel and unique, it being useable for gripping fabrics, without damaging such, and will enable the securing of bed sheets, blankets or other bed dressings, in place on a bedstead, or for securing tent canvas to its holding pegs or for closing bags or the like.

A further object of the invention is the provision of an assembly of this character, which is extremely simple in construction, thoroughly reliable and efficient in use, strong, durable, possessed of few parts, readily and easily handled, quick of application and removal, compact, neat in appearance, and inexpensive to manufacture and install.

With these and other objects in view the invention consists in the features of construction, combination and arrangement of parts as will be hereinafter more fully described, illustrated in the accompanying drawing, and pointed out in the claim hereunto appended.

In the accompanying drawing:

Figure 1 is a plan view of a ring-like member forming one part of the device or assembly constructed in accordance with the invention.

Figure 2 is a plan view of a ring-like resilient member for cooperation with the element of Figure 1.

Figure 3 is a fragmentary sectional view through a fabric article showing the device or assembly completed and in an applied position thereto.

Similar reference characters indicate corresponding parts throughout the several views in the drawing.

Referring to the drawing in detail, A designates generally a portion of a piece of fabric material, such as a sheet, blanket or other dressing for a bed, a tent covering or the like, and the device constructed in accordance with the invention for gripping such piece, comprises a ring-like member 10, which may be otherwise shaped to provide an eye of rigid formation, while in association with this member 10 is a springy endless coil of circular ring-like formation 11, having a diameter generally slightly greater than the pitch diameter of the member 10, and susceptible of distortion. This coil is made from a spiral formed length of inherently springy wire with the ends of the latter permanently joined together to present an endless spring-like contour, as best seen in Figure 2 of the drawing. Instead of a coil, a ring of suitable elastic material may be used.

In the use of these parts 10 and 11 for the gripping of the fabric A or the like, the said fabric is tucked through the member 10 to effect a pocket as at B therein, into which is pressed the coil 11, which when expanded, will grip the fabric A and hold it fast within the member 10, as best seen in Figure 3 of the drawing. In this manner the assembly has a hold-fast engagement with the fabric A, and through a link strap or the like 13, engaged loosely with the member 10, the assembly can be held tied to a bedstead or other anchoring medium, not shown, whereby the fabric will be sustained in a placed relation thereto.

By removing the coil 11 from the member 10, the fabric A can be released from the assembly or device, as should be obvious.

What is claimed is:

In an anchoring device for sheet material, the combination, which comprises, a rigid ring having an offset providing means for attaching a supporting element, and a resilient ring the pitch diameter of which in its free position is greater than that of the rigid ring, said resilient ring comprising an endless wire coil providing a continuous spring-like element adapted to be contracted to provide two substantially parallel coils connected at the ends whereby the said resilient ring may be inserted through the rigid ring and expanded into a bulge of the said sheet material positioned through said rigid ring.

OTMAR A. HUBER.

REFERENCES CITED

The following references are of record in the file of this patent:

UNITED STATES PATENTS

| Number | Name | Date |
|---|---|---|
| 352,769 | Moon et al. | Nov. 16, 1886 |
| 420,083 | McArthur | Jan. 28, 1890 |

FOREIGN PATENTS

| Number | Country | Date |
|---|---|---|
| 32,960 | Norway | Aug. 22, 1921 |